No. 808,232. PATENTED DEC. 26, 1905.
A. L. R. ELLIS.
ELECTROLYTIC METER.
APPLICATION FILED JUNE 22, 1904.
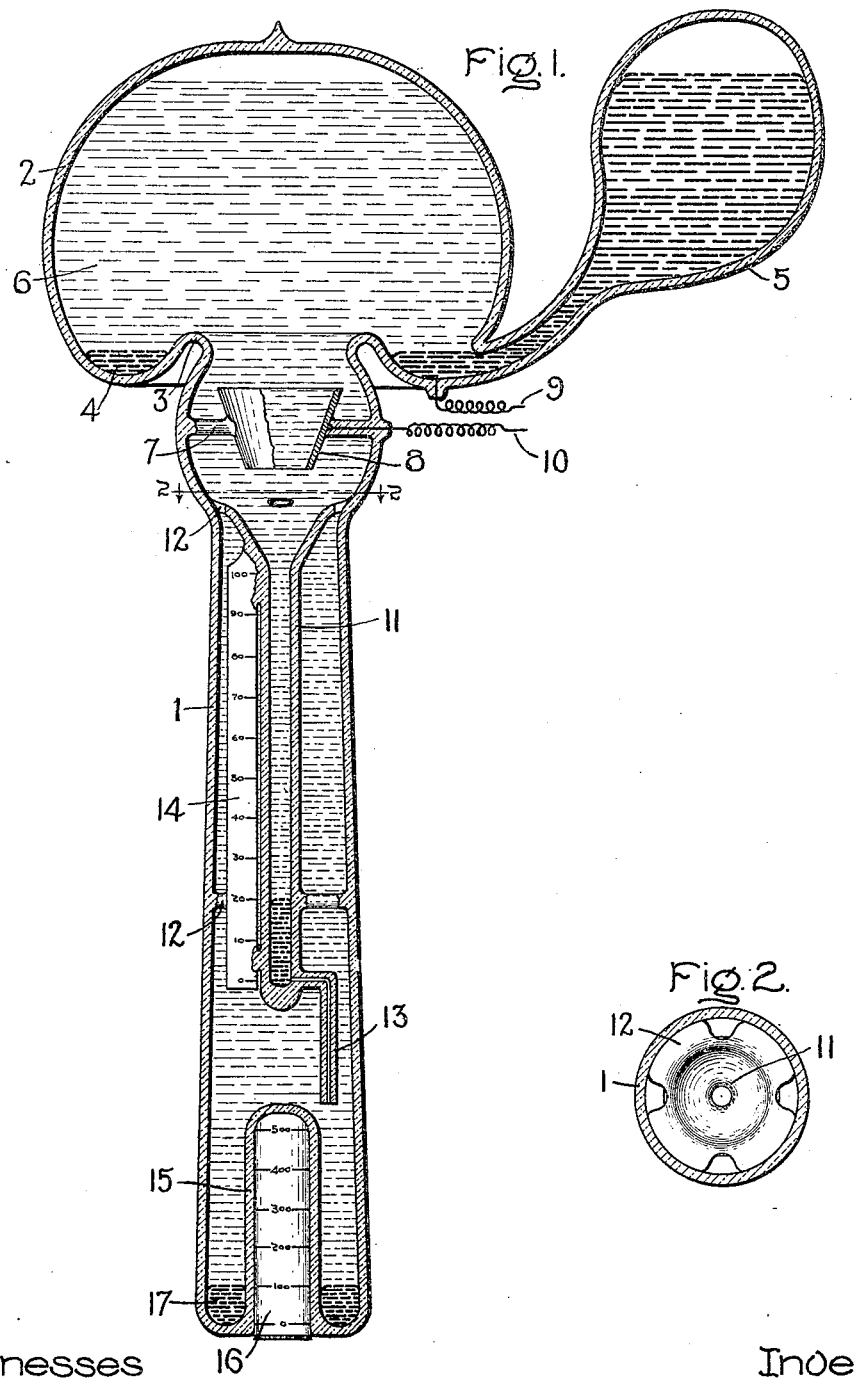
Witnesses
Inventor
Alvarado L. R. Ellis
By _____ Atty.

UNITED STATES PATENT OFFICE.

ALVARADO L. R. ELLIS, OF LYNN, MASSACHUSETTS, ASSIGNOR TO GENERAL ELECTRIC COMPANY, A CORPORATION OF NEW YORK.

ELECTROLYTIC METER.

No. 808,232.　　　Specification of Letters Patent.　　　Patented Dec. 26, 1905.

Application filed June 22, 1904. Serial No. 213,604.

*To all whom it may concern:*

Be it known that I, ALVARADO L. R. ELLIS, a citizen of the United States, residing at Lynn, in the county of Essex and State of Massachusetts, have invented certain new and useful Improvements in Electrolytic Meters, of which the following is a specification.

This invention relates to electric meters, and particularly to meters of the electrolytic type. Its objects are to effect certain improvements in the construction of meters of this type whereby they are made more compact and less liable to breakage and to provide what has been termed a "second-dial" effect—that is, two or more scales so related that the registration is transferred from one scale to another, and the full registration on one scale at the time of the transfer to the next higher scale produces a definite registration on the higher scale.

The novel features of my invention will be definitely indicated in the claims appended hereto.

The details of construction and the mode of operation of my improved electrolytic meter will be better understood by reference to the following description, taken in connection with the accompanying drawings, which show the preferred embodiment of my invention, and in which—

Figure 1 is a sectional elevation of the meter, and Fig. 2 a section on line 2 2 of Fig. 1.

Referring to the drawings, 1 indicates a glass vessel, preferably closed hermetically at all points. The upper portion of the vessel is expanded into a bulb 2, the lower edge of which is curled under to form an inwardly-projecting lip 3. An annular chamber or pocket is thus provided by the lip 3 and the outer wall of the bulb 2, and this chamber is filled with mercury or some other metallic conducting substance, which constitutes the anode of the meter. A glass bulb 5 is sealed into bulb 2, communicating with the annular anode-chamber 4. This bulb is filled with mercury and in accordance with well-known principles maintains the mercury in the anode-chamber at a constant level. The remainder of the vessel 1 is filled with the electrolyte 6, which may be a solution of mercurous nitrate or any other suitable solution. Immediately below bulb 2 the vessel 1 is enlarged slightly, and this enlargement is provided with a number of inwardly-projecting radial arms 7, which support centrally of the vessel a hollow cone-shaped piece 8, having its smaller end downward. This cone or funnel is made of platinum or other metal or may be of some other material having its inner surface covered with platinum foil and forms the cathode of the meter. A platinum or platinum-tipped wire 9 is sealed into the bulb 2, communicating with the anode-chamber 4, and a similar wire 10 is sealed into the enlargement in the vessel 1 and connected to the cathode 8.

Immediately below the cathode 8 in vessel 1 and also centrally disposed is a tube 11, funnel-shaped at its upper end and secured in position by arms 12, which are fused to the sides of vessel 1, openings being provided between the arms 12 of sufficient size to permit the free flow of a liquid therethrough. The tube 11 is closed at its lower end except for a tube 13, having a very small opening, not greater than .005 of an inch, therethrough, which is sealed into tube 11 close to its lower end and which is bent downward, as shown. Tube 11 is graduated, or a scale 14 is mounted alongside the tube and provided with suitable scale-markings. A tube 15, closed at its end, is sealed into the lower end of vessel 1 and extends upwardly into the vessel, as shown. This tube is graduated, or a scale 16 is mounted therein, though the scale 16 may be arranged in any other way desired to show the height of the indicating fluid in the receptacle 17 at the bottom of the vessel 1.

As thus constructed the meter is connected in circuit by means of the leads 9 and 10 in any suitable relation for metering the flow of current. When the electric energy is being used, the mercury or other fluid constituting the anode in the chamber 4 is deposited on the cathode 8 and falls by gravity into the tube 11. The mercury in tube 11 does not, however, flow through the tube 13, as its surface tension is sufficient to prevent this until such an amount has been deposited in tube 11 that its accumulated weight is sufficient to overcome the surface tension and force the mercury through the small opening in tube 13. When this occurs, the entire column of mercury in tube 11 flows through tube 13 and drops into the annular chamber at the bottom of vessel 1 around tube 15, and the mercury which thereafter is deposited on the cathode 8 drops by gravity into tube 11 and again accumulates until another column of equal height is formed therein. This arrangement therefore gives the second-dial effect. The opening in tube 13 may be so small that tube 11 is filled with mercury before any passes through tube 13, and the annular chamber at the bottom of the vessel may be of such size that the entire column of mercury in tube 11 when transferred to the chamber 17 rises only a short distance around the tube 15. The markings on scale 14 should therefore subdivide the height to which the mercury rises in tube 11 before any passes through the tube 13, and the markings on scale 16 should be spaced to indicate the height to which the mercury rises in chamber 17 each time tube 11 is emptied into it. Scale 14 may thus be arranged to denote units of energy or current and scale 16 tens or hundreds of units.

As shown in the drawings, tube 11 has been filled once to the "100" mark, and the mercury therein has then passed through tube 13 and dropped into receptacle 17, thus transferring the registration of one hundred units from scale 14 to scale 16, and tube 11 has again filled to the "20" unit-mark, so that the reading of the meter is "120" units.

If desired, a third scale can be provided in a similar manner.

To restore the meter to its initial condition after a reading has been made, it is only necessary to turn the meter bodily to an inverted position, carrying the upper end to the right, thus permitting all the mercury from the annular chamber at the bottom of the vessel and from tube 11 to flow back into the bulb 5 and the anode-chamber 4.

What I claim as new, and desire to secure by Letters Patent of the United States, is—

1. An electrolytic meter having an anode, a cathode, two receptacles for the electrodeposited material, and means dependent upon the surface tension of the deposited material for emptying the entire contents of one receptacle into the other.

2. An electrolytic meter having an anode, a cathode, a receptacle for the electrodeposited material having a small opening at the lower end thereof, a second receptacle below said opening, and means to indicate the amount of electrodeposited material in each of said receptacles.

3. An electrolytic mercury-meter having an anode-chamber, mercury therein, a cathode, a receptacle for the electrodeposited mercury, a tube having a capillary opening therethrough sealed into the lower end of said receptacle, and a second receptacle below said tube.

4. An electrolytic mercury-meter having an anode-chamber, mercury therein, a cathode, a graduated receptacle below the cathode for collecting the electrodeposited mercury in a single column, a second graduated receptacle, and means dependent upon the height of said column for permitting the flow of the mercury constituting said column into the second receptacle.

5. An electrolytic mercury-meter having an anode-chamber mercury therein, a cathode, a receptacle for the electrodeposited mercury having a small opening at its lower end, a scale-plate for the receptacle, and a second receptacle below said opening and a scale-plate for the second receptacle.

6. An electrolytic meter comprising a glass vessel, an anode, a cathode, and an electrolyte therein, electrical connections therethrough to the anode and cathode, a receptacle within the vessel directly below said cathode having a small opening at its lower end, a second receptacle below said opening, and means to indicate the amount of electrodeposited material in said receptacles.

7. An electrolytic mercury-meter comprising a glass vessel, an anode-chamber therein, mercury in said chamber, a cathode having a metallic surface supported within the vessel, a tube funnel-shaped at its upper end directly below the cathode, a tube having a small opening therethrough connected to said tube at its lower end, and a receptacle below said tubes.

In witness whereof I have hereunto set my hand this 20th day of June, 1904.

ALVARADO L. R. ELLIS.

Witnesses:
DUGALD McK. McKILLOP,
JOHN JAY WALKER.